US008634845B2

(12) United States Patent
Frost et al.

(10) Patent No.: US 8,634,845 B2
(45) Date of Patent: Jan. 21, 2014

(54) NETWORK AND METHOD FOR OPTIMIZING CELL RESELECTION BY USING AN ESTIMATION OF MOBILITY OF A MOBILE TERMINAL

(75) Inventors: Timothy James Frost, Bristol (GB); Alessandro Goia, San Benigno Canavese (IT); Christopher David Pudney, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 831 days.

(21) Appl. No.: 12/223,502

(22) PCT Filed: Feb. 2, 2007

(86) PCT No.: PCT/GB2007/000368
§ 371 (c)(1),
(2), (4) Date: Jan. 29, 2009

(87) PCT Pub. No.: WO2007/088381
PCT Pub. Date: Aug. 9, 2007

(65) Prior Publication Data
US 2011/0130141 A1 Jun. 2, 2011

(30) Foreign Application Priority Data

Feb. 3, 2006 (GB) .................................. 0602262.8
Feb. 7, 2006 (GB) .................................. 0602428.5
May 2, 2006 (GB) .................................. 0608613.6

(51) Int. Cl.
*H04W 24/00* (2009.01)
(52) U.S. Cl.
USPC ........................................ 455/456.1; 455/436
(58) Field of Classification Search
USPC .................. 455/436, 456.1, 434, 440, 452.1; 709/230
See application file for complete search history.

(56) References Cited

U.S. PATENT DOCUMENTS 6,067,460 A * 5/2000 Alanara et al. ................. 455/574
6,553,236 B1 * 4/2003 Dunko et al. .............. 455/456.1
(Continued)

FOREIGN PATENT DOCUMENTS

WO WO99/62285 A1 12/1999
WO WO 01/43462 A2 6/2001
WO WO01/58201 A1 8/2001

OTHER PUBLICATIONS

"Universal Mobile Telecommunications System (UMTS)", ETSI Standards, European Telecommunications Standards Institute, Sophia-Antipo, FR, vol. 3-R2, No. V680, Dec. 2005, XP014032575.

(Continued)

*Primary Examiner* — Jinsong Hu
*Assistant Examiner* — Nathan Taylor
(74) *Attorney, Agent, or Firm* — Muirhead and Saturnelli, LLC (57) ABSTRACT

The mobile telecommunications network (n) has at least one mobile terminal (1) registered therewith. The network (n) has an active communication state with the mobile terminal (1) and an inactive communication state with the mobile terminal (1). Means Q; V for calculating an indication of the movement of the mobile terminal (1) within the network (n) in each of the states is provided. One embodiment is characterized in that, when the communication changes from a first of the states to a second of the states, the mobility indication calculated in the first of the states is used in the second of the states. In another embodiment, the indication of movement of the mobile terminal is calculated periodically at a time interval (CMCL). A value (DRX Cycle Length) which determines this time interval (CMCL) is transmitted by the network (n) to the mobile terminal (1). This second embodiment is characterized by including means for varying the time interval (CMCL) in dependence upon an indication of movement of the terminal (1).

29 Claims, 5 Drawing Sheets (56) References Cited

U.S. PATENT DOCUMENTS

| | | | |
|---|---|---|---|
| 6,611,688 B1* | 8/2003 | Raith | 455/456.1 |
| 6,711,408 B1* | 3/2004 | Raith | 455/440 |
| 6,853,911 B1* | 2/2005 | Sakarya | 701/455 |
| 6,970,708 B1* | 11/2005 | Raith | 455/440 |
| 2001/0031638 A1* | 10/2001 | Korpela et al. | 455/449 |
| 2002/0046287 A1* | 4/2002 | La Porta et al. | 709/230 |
| 2002/0068581 A1* | 6/2002 | Salonaho | 455/456 |
| 2002/0147024 A1* | 10/2002 | Wan | 455/515 |
| 2002/0160788 A1* | 10/2002 | Duffett-Smith et al. | 455/456 |
| 2004/0106414 A1* | 6/2004 | Ewert et al. | 455/456.1 |
| 2004/0121771 A1* | 6/2004 | Song et al. | 455/436 |
| 2005/0012611 A1* | 1/2005 | Osman | 340/539.13 |
| 2005/0075110 A1* | 4/2005 | Posti et al. | 455/452.1 |
| 2005/0143071 A1* | 6/2005 | Jaakkola et al. | 455/436 |
| 2005/0148348 A1* | 7/2005 | Cramby et al. | 455/458 |
| 2006/0128392 A1* | 6/2006 | Turina et al. | 455/452.1 |
| 2007/0149192 A1* | 6/2007 | Kim et al. | 455/435.1 |
| 2007/0218889 A1* | 9/2007 | Zhang et al. | 455/422.1 |

OTHER PUBLICATIONS

3GPP TS 05.08 V8.23.0 (Nov. 2005), Technical Specification, 3rd Generation Partnership Project; Technical Specification Group GSM/EDGE Radio Access Network; Radio subsystem link control (Release 1999), 100 pp.

3GPP TS 23.236 V6.2.0 (Dec. 2005), Technical Specification, 3rd Generation Partnership Project; Technical Specification Group Services and System Aspects; Intra-domain connection of Radio Access Network (RAN) nodes to multiple Core Network (CN) nodes (Release 6), 37 pp.

3GPP TS 25.304 V6.8.0 (Dec. 2005), Technical Specification, 3rd Generation Partnership Project; Technical Specification Group Radio Access Network; User Equipment (UE) procedures in idle mode and procedures for cell reselection in connected mode (Release 6), 38 pp.

ETSI TS 125 331 V6.8.0 (Dec. 2005), Technical Specification, Universal Mobile Telecommunications System (UMTS); Radio Resource Control (RRC); Protocol specification (3GPP TS 25.331 version 6.8.0 Release 6), pp. 1-100.

* cited by examiner

NETWORK AND METHOD FOR OPTIMIZING CELL RESELECTION BY USING AN ESTIMATION OF MOBILITY OF A MOBILE TERMINAL

TECHNICAL FIELD

This application relates to a mobile or cellular telecommunications network, and a method of operating a telecommunications network, and in particular to efficient mobility management of mobile terminals.

BACKGROUND TO THE INVENTION

Mobile networks such as 2G (GSM) or 3G (UMTS) telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Calculations to determine whether to perform a handover from one base station to another base station are performed by the network, whereas calculations whether to perform cell reselection are performed by the mobile terminal.

The frequency with which a mobile terminal checks to determine whether any paging messages are transmitted by the network is the "DRX Cycle Length". The DRX Cycle Length value is transmitted by the network to the mobile terminal and is the same for all mobile terminals in a particular group of cells (in a particular registration area, routeing area or location area). The DRX Cycle Length is intended to reduce the terminal battery consumption, and thus operators would normally set this as long as possible whilst considering paging message delay.

In the idle/inactive state, cell reselection is performed in accordance with measurements of the signal strength (or the like) of the cell on which the mobile terminal is currently camped and of neighbouring cells. These measurements are required to be performed at a minimum frequency determined by a cell measurement cycle length (CMCL). It is a limitation of known mobile telecommunications systems that the cell measurement cycle length is defined relative to the DRX cycle length (it is a divisor of the DRX cycle length). Thus, when the DRX cycle length is transmitted to a mobile terminal by the network, this also sets the cell measurement cycle length. However, the setting of the cell measurement cycle length in this way can be disadvantageous. The cell measurement cycle length should be shorter if a mobile terminal has a fast moving mobility state and can be relatively long when the mobile terminal is in a slow moving mobility state. However, in the prior art, the cell measurement cycle length is set only in dependence upon the DRX cycle length.

In the idle/inactive state the mobility state of a mobile terminal can be used to optimise cell reselection parameters. Similarly, in the active state, the calculated mobility state can be used to optimise the handover parameters. In the idle/inactive state the mobility state is determined by the mobile terminal, whereas in the active communication state, the mobility state is calculated by the network. The cell reselection parameters and handover parameters can be set optimally by using a history of mobility state measurements. However, it is difficult to build a history of mobility state measurements in either the active state or inactive state in the prior art if the mobile terminal frequently moves between the active and inactive states.

SUMMARY OF THE INVENTION

According to the system described herein, a mobile telecommunications network may include at least one mobile terminal registered therewith and means for calculating periodically at a minimum frequency/maximum time interval an indication of the movement of the mobile terminal within the network, wherein a value which determines said frequency/time interval is transmitted to the mobile terminal by the network. Further, the system described herein may include means for varying said value and/or said time interval in dependence upon said movement indication.

The indication of the movement may be calculated at the frequency/time interval.

The frequency/time interval may be proportional to, directly proportional to and/or a factor of value transmitted to the mobile terminal.

In a first embodiment of the system described herein, the mobile terminal has an active state and an inactive state, and the varying means is operable to vary the frequency/time interval (cell measurement cycle length interval, CMCL) in the inactive state. In the inactive state the calculating means calculates an indication of the movement of the mobile terminal at the time interval (CMCL). The calculating means may determine whether the mobile terminal is in a "high mobility" or a "low mobility" state. At this CMCL interval the signal strength of the base station with which the mobile terminal is currently registered and the neighbouring base stations are measured in order to determine whether the mobile terminal should change the base station on which it is camped. This may be referred to as a cell reselection procedure.

In the first embodiment, the value transmitted to the mobile terminal by the network is a DRX cycle length value (although could be another value transmitted by the network). This value may be transmitted in response to a routeing area update or location area update (but could be transmitted on a different basis). The DRX cycle length value is set by the network and is used to determine the intervals at which the mobile terminal listens for paging communications from the network when it is in the idle state. Conventionally, the CMCL interval is defined relative to the DRX cycle length (that is a divisor of the DRX cycle length). That is, the value of the DRX cycle length sets the value of the cell measurement cycle length. This can be unsatisfactory because the frequency at which paging messages need to be detected optimally may be different from the frequency with which cell measurements need to be performed optimally. For example, cell measurements may need to be performed more frequently if the mobile terminal is in a high mobility state. The first embodiment of the invention overcomes this limitation of the prior art by providing means for varying the time interval (the cell measurement cycle length) in dependence upon the mobility state.

In the first embodiment, initially the (e.g. DRX Cycle Length) value transmitted to the mobile terminal determines or sets the CMCL time interval for calculating the movement indication. However, advantageously, the first embodiment then allows the CMCL time interval to be varied in dependence upon the movement indication so that the CMCL time interval can be optimised according to this movement indication. Alternatively the (e.g. DRX Cycle Length) value may be varied in dependence upon the movement indication.

In the first embodiment the relationship between the (e.g. DRX Cycle Length) value and the CMCL time interval may remain. Therefore, when the varying means varies the CMCL time interval the (e.g. DRX Cycle Length) value is also varied (and vice versa). As the (e.g. DRX Cycle Length) value determines the paging interval, the paging interval is varied when the CMCL time interval is varied. Alternatively the CMCL time interval may be a factor of the DRX cycle length and thus the DRX cycle may remain unchanged.

In the first embodiment the mobile terminal may include the varying means. The calculating means is also provided in the mobile terminal, and data generated thereby is used by the calculating means to vary the CMCL time interval.

However, in an alternative arrangement of the first embodiment, the network includes the calculating means and transmits a message to the mobile terminal which causes it to vary the CMCL time interval in dependence upon the movement indication generated by the calculating means in the network.

The "indication of movement" calculated by the calculating means may be the rate of movement of the mobile terminal, speed of the mobile terminal, velocity of the mobile terminal or the like.

According further to the system described herein, a mobile telecommunications network is provided with which at least one mobile terminal is registered, wherein the network has an active communication state with the mobile terminal and an inactive communication state with the mobile terminal, and wherein means for calculating an indication of the movement of the mobile terminal within the network in each of said states is provided, and wherein, when communication changes from a first of said states to a second of said states, said movement indication calculated in the first of said states is used in the second of said states.

In the inactive state the mobile terminal may include a first processor which comprises the calculating means, and uses the movement indications generated thereby to set cell reselection parameters. For example, if it is determined that the mobile terminal is in a high mobility state, the criteria for performing cell reselection will be different to the criteria for performing cell reselection when the mobile terminal is determined to be in a low mobility state.

In the active state the network may include a second processor which comprises the calculating means, and uses the movement indications generated thereby to set handover parameters. For example, if it is determined that the mobile terminal is in a high mobility state, the criteria for performing handover will be different to the criteria for performing handover when the mobile terminal is determined to be in a low mobility state.

In the inactive state the cell reselection criteria are set optimally by using a history of mobility state measurements over a period of time. Similarly, in the active communication state, the handover criteria are set optimally by using a history of mobility state measurements. Advantageously, and in contrast to the prior art, the second embodiment of the system described herein allows mobility state measurements taken in the inactive communication state to be used in the active communication state, and vice versa. This overcomes the limitation of the prior art, where it is difficult to build a history of mobility state measurements in either the active state or inactive state if a mobile terminal frequency moves between the active and inactive states.

BRIEF DESCRIPTION OF THE DRAWINGS

Embodiments of the system described herein will now be described by way of example with reference to the accompanying drawings, which are briefly described as follows.

In the drawings like elements are generally designated with the same reference sign.

DETAILED DESCRIPTION OF VARIOUS EMBODIMENTS

Certain elements of a mobile telecommunications network n, and its operation, will now briefly be described with reference to FIG. 1 which may be used in connection with embodiments of the system described herein.

Each base station (BS) corresponds to a respective cell of its cellular or mobile telecommunications network and receives calls/data from and transmits calls/data to a mobile terminal in that cell by wireless radio communication in one or both of the circuit switched or packet switched domains. Such a subscriber's mobile terminal (or User Equipment-UE) is shown at 1. The mobile terminal may be a handheld mobile telephone, a personal digital assistance (PDA), a laptop computer equipped with a datacard, or a laptop computer with an embedded chipset containing the UE's functionality.

In a GSM (2G) mobile telecommunications network, each base station subsystem 3 comprises a base transceiver station (BTS) 2 and a base station controller (BSC) 4. A BSC may control more than one BTS. The BTSs and BSCs comprise the radio access network.

In a UMTS (3G) mobile telecommunications network, a radio network controller (RNC) 13 may control more than one node B 6. The node B's and RNC's form base station 7 and comprise the radio access network.

The base stations may be arranged in groups and each group of base stations is may be controlled by one mobile switching centre (MSC), such as MSC 2 for base stations 3,4 and 5, and MSC 6, for base stations 7,8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known location of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points. This enables the network to offer the subscriber advanced services and features by interfacing with service application servers based on CAMEL, OSA (Open Service Access) and SIP.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 7 associated with the particular cell in which the terminal 1 is located. In a traditional network, the base station 7 then transmits this IMSI to the MSC 6 with which the BS 7 is registered. In a network using the functionality described in 3GPP TS 23.236, the base station follows prescribed rules to select which MSC to use, and then transmits this IMSI to the selected MSC.

MSC 6 now accesses the appropriate location in the HLR/HSS 10 present in the network core (CN) 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 6), and the subscriber's information is temporarily stored in the VLR (VLR 14) associated with that MSC. The information stored on the VLR 14 includes a Temporary Mobile Subscriber Identification (TMSI) number for identification purposes for the terminal within the MSC 6. The TMSI number is an identification number that is typically 32 bits in length. In conventional systems, therefore, the TMSI number is not allocated to more than one user of a given system served by that MSC at one time. Consequently, the TMSI number is usually invalidated when the mobile station crosses into a new location served by a different MSC.

When the HLR 10 is interrogated by the MSC 6 in the manner described above, the HLR 10 additionally performs an authentication procedure for the mobile terminal 1. The HLR 10 transmits authentication data to the MSC 2 in "challenge" and "response" forms. Using this data, MSC 6 passes a "challenge" to the mobile terminal 1 through base station 7. Upon receipt of this data, the mobile terminal 1 passes this data to its SIM and produces a "response". This response is generated using an encryption algorithm on the SIM and a unique Ki on the SIM. The response is transmitted back to the MSC 6 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 6 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 6 and MSC 2) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 7 and passed on to the MSC 6. The MSC 6 routes the calls towards the called party via the MSC 6. By means of the information held in the VLR 14, MSC 6 can associate the call with a particular subscriber and thus record information for charging purposes.

The MSCs 6 and 2 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 6 and 2. The SGSNs 16, 18 are equipped with an equivalent to the VLR for the packet switched domain. GGSN 19 provides IP connectivity to the CN 12, for example to Packet Data Network 20 (such as the Internet).

Figure 1:
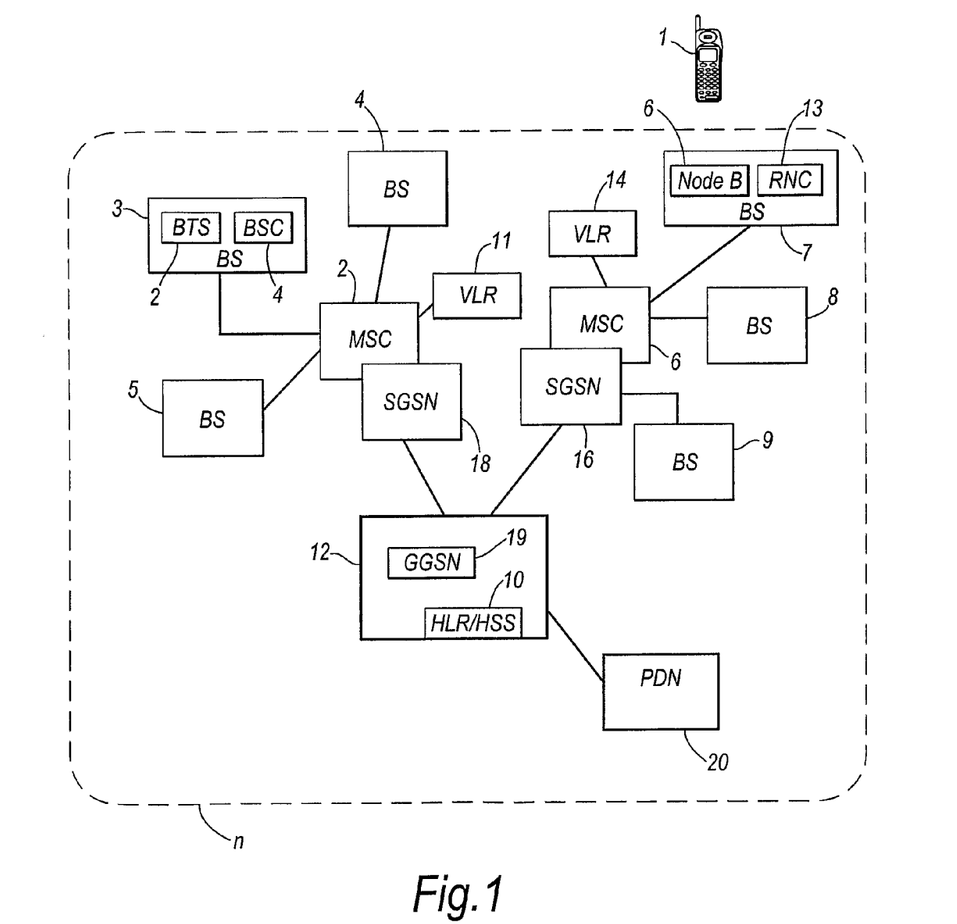
FIG. 1 is a diagrammatic drawing of certain elements of a mobile telecommunications network for use in explaining the operation of such a network in connection with embodiments of the system described herein.

The network of FIG. 1 includes two Radio Access Technologies (RATs): 2G(GSM) and 3G(UMTS).

From the description above, it will be understood that the coverage area of a mobile telecommunications network is divided into a plurality of cells, each of which is served by a respective base station.

A mobile terminal has an active mode and an idle/inactive mode. In the idle/inactive mode a mobile terminal "camps" on what is determined to be the best cell. As the mobile terminal moves around, the best cell changes and cell reselection is performed by the mobile terminal to change the cell on which the mobile terminal is camped.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network (that is, cell reselection has been performed), the precise cell in which the mobile terminal is located may not be known. It will therefore be necessary to perform paging in a number of cells. The greater the number of cells in which paging must occur, the more use of valuable signalling capacity within the network.

However, if the HLR/HSS 10 is to always have an up-to-date record of the cell in which each mobile terminal is located so that the current cell which is occupied by a terminal is always known, this will require a large amount of location updating signalling between the mobile terminal and the HLR/HSS 10 in order that the HLR/HSS 10 has up-to-date records of the cells occupied by each mobile terminal. This is also wasteful of valuable signalling capacity.

As indicated above, the HLR/HSS 10 is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner in 2G and 3G networks by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI and the terminal's current TMSI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routeing area relates to a particular geographical area for communications in the packet-switched domain. Typically, although not necessarily, a routeing area is larger than the area of a single cell but is smaller than the area covered by one SGSN. A routeing area is typically, although not necessarily, smaller than a location area. There may be many routeing areas within one location area. Each cell within the network broadcasts data indicative of its routeing area (RAI) in addition to the data mentioned above indicative of the identity of its location area. The mobile terminal uses this received data to determine when it has moved to a new roueting area. The terminal stores the last known routeing area on its SIM. The information stored on the SIM is compared with the routeing area information broadcast by the local cell. The identities of the two routeing areas are compared. If they are different, the mobile terminal determines that it has entered a new routeing area. The mobile terminal then gains access to a radio channel and requests a routing area update (RAU). The routeing area is updated in the same manner as the location area, as discussed above.

If a mobile terminal listened for pages continuously, this would waste battery resource and would reduce battery life. Instead, the mobile terminal listens for pages from the network only periodically—at a frequency defined by the "DRX cycle length".

DRX (discontinuous reception) is a technique that allows the mobile terminal to power down significant amounts of its internal circuitry for a high percentage of the time when it is in the idle or inactive mode. It also enables the mobile terminal to be is aware of when page requests for it may be transmitted and it can then therefore schedule other tasks such that it avoids the problem of not decoding valid page requests transmitted by the network in the idle mode periods. The technique works by dividing the mobile terminals within a cell into a set of groups. The group in which a mobile terminal resides is then known locally at both the mobile terminal and the base station. All paging requests to each group are then scheduled and sent at a particular time, which is derived in conjunction with the IMSI of the mobile terminal and some BCCH (Broadcast Control Channel) transmitted data. Thus both the base station and the mobile terminal know when relevant page requests will be sent and the mobile terminal can power down for the period when it knows that page requests will not occur.

The DRX cycle length is may be set for each mobile terminal during a routeing area update or it may be indicated on the broadcast channel across the location area. Therefore, in prior art systems all mobile terminals in a particular routeing area or location area typically have the same DRX cycle length.

Setting the DRX cycle length too short will mean that there is an increase in the mobile terminal battery consumption whilst it is in idle or inactive states. Setting the value of this parameter to too high a value will mean that the setup of mobile terminated calls or the transfer of mobile terminated data will have a longer delay. So there is a trade-off in setting the value of the DRX cycle length.

Having just discussed the idle/inactive mode, the active mode will now briefly be discussed. In the active mode, in order to allow a mobile terminal to maintain a call when the mobile terminal moves outside the coverage area of a cell, the call must be switched to an alternative cell automatically. This process is referred to as "handover". The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronisation of events between the mobile terminal and the network.

In a mobile network operating in accordance with the 3G (UMTS) Standards, a mobile terminal device (UE) has a so-called "RRC (Radio Resource Control) state" which depends on its state of activity. In the respective RRC states different functions for mobility are executed. These functions are described in technical specification 3GPP TS 25.304/ 25.331.

For 2G and 3G, a mobile terminal is in active communication when it has a CS (Circuit Switched) connection established.

In 2.5G, GPRS PS (Packet Switched), active communication can be defined as the GPRS Ready state. In 3G UMTS PS, active communication can be defined as the RRC connected mode state that is CELL_DCH, and thus excluding CELL/URA_PCH RRC connected mode states.

In 3G UMTS PS, CELL/URA_PCH and CELL_FACH can be defined as inactive states. In GPRS, the Standby state can be regarded as an inactive state.

Either one or both of the CS and PS active communications may occur in the mobile terminal.

The RRC states will now briefly be described.

For a 3G mobile terminal, in the active mode the terminal is in the RRC connected mode. The RRC connected mode includes the following states:

CELL_DCH state is characterized by:
  A dedicated physical channel is allocated to the UE in uplink and downlink.
  The UE is known on cell level according to its current active set
  Dedicated transport channels, downlink and uplink transport channels and a combination of these transport channels can be used by the UE.

CELL_FACH state is characterized by:
No dedicated physical channel is allocated to the UE.
The UE continuously monitors a FACH (forward access channel) in the downlink.
The UE is assigned a default common or shared transport channel in the uplink (e.g. RACH) that it can use anytime according to the access procedure for that transport channel.
The position of the UE is known by UTRAN on cell level according to the cell where the UE last made a cell update.
CELL_PCH state is characterized by:
No dedicated physical channel is allocated to the UE. The UE selects a PCH (paging channel) with the algorithm, and uses DRX for monitoring the selected PCH via an associated PCH.
No uplink activity is possible.
The position of the UE is known by UTRAN on cell level according to the cell where the UE last made a cell update in CELL_FACH state.
URA_PCH state is characterized by:
No dedicated channel is allocated to the UE. The UE selects a PCH, and uses DRX for monitoring the selected PCH via an associated PCH.
No uplink activity is possible.
The location of the UE is known on UTRAN registration area (URA) level according to the URA assigned to the UE during the last URA update in CELL-FACH state.

In the CELL_DCH state a network-driven handover is performed when necessary, as described in 3GPP TS 25-331. In this state a mobile terminal scans the pilot channels of up to 32 intra-frequency cells neighbouring its current cell. The mobile terminal forms a list of the best cells for possible handover based on the received signal strength and/or quality (i.e. the error rate in the received signal). The information in this list is passed to the UTRAN RNC on an event-driven basis, e.g. when the signal strength or signal-to-noise ratio of one of the cells exceeds a threshold. The information list is used by a handover algorithm implemented in the UTRAN RNC. The algorithm that determines when handover occurs is not specified in the GSM or UMTS Standards. The algorithms essentially trigger a handover when the mobile terminal 1 provides a measurement of a neighbour cell received signal at the mobile terminal 1 below a predetermined quality received threshold, which typically has a relation to the quality of the received signal from the serving cell (e.g. better quality by some margin).

In the "CELL_FACH", "CELL_PCH", "URA_PCH" or "idle mode" the mobile terminal controls its own mobility independently and starts a cell switch (reselection) when a neighbouring cell has a better quality than the current cell, as described in 3GPP TS 25.304. A similar procedure is also used in GSM/GPRS mobile networks, as described in technical specification 3GPP TS 05.08 (UE-based cell reselection).

In general, a mobile terminal in "idle mode" states and in RRC connected mode (inactive) states "CELL_FACH", "CELL_PCH" and "URA_PCH" performs periodic measurements of its own as well as of a series of neighbouring cells. The measurements are not made continuously, as this would be wasteful of battery power. Instead, at least in states where DRX is performed (CELL_PCH and URA_PCH) these measurements are performed at a frequency determined by a Cell Measurement Cycle Length (CMCL). Information about the neighbouring cells is broadcast in the system information block 11 (SIB11) or system information block 12 (SIB12) of the broadcast channel (BCH) as described in 3GPP TS 25.304 and 3GPP TS 25.331.

A switch from the current cell to a neighbouring cell generally takes place in the aforementioned idle/inactive states when a neighbouring cell is technically better than the current cell. It is thus ensured that a mobile terminal is generally located in the cell of a mobile network in which it needs the lowest possible transmitting power in order to contact the closest base station (NodeB) and/or has the best reception conditions.

In order to avoid a cell switch based on short-term changes in the radio field conditions, so-called "fading", and the subsequent return to the original cell, a UMTS system mainly uses two parameters that are emitted in the Broadcast Channel (BCH) in the system information block 3 (SIB3) or system information block 4 (SIB4). Notably, these are the time interval "Treselection" and the hysteresis value "Qhyst". In order to avoid too fast a switch between cells based on quickly changing network conditions, a switch from the original cell to the neighbouring cell only takes place if the neighbouring cell was better than the original cell by the factor "Qhyst" for the time "Treselection". This behaviour of a mobile end device is described in detail on the technical specification 3GPP TS 25.304.

Many mobile network systems in accordance with the UMTS standard are designed such that they use more than one frequency and the development of the cells occurs in small cells ("micro-cells") and larger cells ("macro-cells"). In general, this type of arrangement is called "hierarchical cell structure" (HCS) in cellular networks. This arrangement is described in 3GPP TS 25.304.

In HCS slow-moving or stationary mobile terminals should be located in the smallest possible cells, such as micro-cells, while (faster) moving mobile terminals are preferably located in larger cells, such as macro-cells. This reduces the number of cell switches for faster moving mobile terminals. In order to identify whether a mobile terminal is moving or stationary, HCS uses the determination of the number of cell changes (parameter NCR) over a specified period of time (parameter TCR) as described, for example, in WO-A-2001043462.

Both parameters NCR and TCR are reported to the mobile terminal via the BCH (in SIB3 or 4) in each cell and the mobile terminal decides using the number of cell changes (NCR) in time period (TCR) whether it is in a so-called "low-mobility" or "high-mobility" state. If the mobile terminal is in a "low-mobility" state, it favours a cell change in smaller cells (micro-cells) and in a "high-mobility" state, it favours larger cells (macro-cells). The result of this behaviour is that the number of cell changes for fast-moving mobile end devices is minimised, whereby the capacity of the mobile network is maximised overall.

In non-HCS networks there are also mobility handling methods that enable the mobile terminal to be able to modify cell re-selection parameters based on whether it is moving quickly or slowly, as described in 3GPP TS 25.304 from Release 6 onwards. For example, again, the number of cell changes (NCR) over a specified period of time (TCR) can be used, or the degradation of received pilot channel power within a given time period being above a threshold can be used. Other methods are also possible.

As indicated above, in the inactive/idle state, the measurements of the current cell and the neighbouring cells are made periodically—at a frequency determined by a Cell Measurement Cycle Length. The Cell Measurement Cycle Length may be defined as a divisor of the DRX Cycle Length discussed above (e.g. if DRX cycle length is 640 ms, then CMCL=320 ms or 80 ms) and used for efficient paging of mobile terminals. As mentioned above, the DRX Cycle Length may be set by the network for all mobile terminals in a particular routeing area/location area.

This relationship between the Cell Measurement Cycle Length and DRX Cycle Length means that setting a larger value for DRX Length delays in the mobile terminal's ability to identify changes in radio environment with respect to neighbour cells and thus causes cell re-selection performance may be less reactive. This is not an issue in cases where the radio environment is slow changing, and, in cases where the mobile terminal is stationary, this may be advantageous as it may in some cases counteract the effects of slow fading. However, in situations where the mobile terminal is moving quickly, the slow reaction in realising when a cell change is needed may cause problems in intra/inter-frequency and inter-RAT scenarios.

Intra-Frequency Case

In intra-frequency cases, the mobile terminal may make access on a cell that is not the best cell, and cause unnecessary interference to the target cell. Even worse, the mobile terminal may actually lose coverage of the serving cell and start a general cell search before it identifies that the target cell is the best cell. There is a delay before this general cell search begins, and it can be even less reactive than the required cell measurement cycle. Therefore, it is not really desirable.

Inter-Frequency Case

In inter-frequency cases, the cell re-selection performance is likely to be even slower. Thus, some of the same problems are likely to be a factor as in the intra-frequency case (apart from interference). Additionally, the re-selection parameters are not followed for "cell selection" thus it may prove problematic for operators who have planned their networks with a certain strategy.

Inter-RAT Case

In inter-RAT cases (where a mobile terminal moves between different Radio Access Technologies—e.g. GSM and UMTS) this may prevent the mobile terminal from finding GSM coverage when UMTS coverage is not available, which is essential for the mobile terminal not to lose coverage of the operator's network.

With the Cell Measurement Cycle Length selection arrangement paging may therefore be ineffective until the mobile terminal determines that it has lost coverage of the serving UMTS cell. This is not really acceptable as the mobile terminal will take some time to derive that it has lost coverage, and in the meantime it cannot access the network. There are several possible solutions to this problem.

Re-Selection Parameter Settings

Relying on cell re-selection parameters does not help because these rely on good underlying measurement performance, and thus these can only be triggered once the mobile terminal has performed sufficient measurements to correctly rank the cell. Thus this does not solve the root of the problem.

Shortening the DRX Cycle Length

Setting a short DRX cycle length (which would consequently reduce the Cell Measurement Cycle Length) would solve the problem, but this would be common for all mobile terminals in the routeing area/location area and thus it would waste battery power in situations where frequent measurements are not needed.

Re-Designing the Measurement Requirements

Totally changing the measurement requirements within UMTS would be an optimal solution. However, this would have quite a high impact on mobile terminal and network implementations. Therefore, it is not desirable.

An improved solution according to a first embodiment of the system described herein exploits the fact that the mobile terminal (in UMTS) must support a range of DRX cycle lengths. When the mobile terminal is in a state where it is performing "cell re-selection" based on DRX cycles, and the mobile terminal deems that it is moving at high speeds (or low speeds), then in accordance with the embodiment the mobile terminal overrides the DRX Cycle Length (and consequent Cell Measurement Cycle Length) values sent during the last routing/location area update, and selects its Cell Measurement Cycle Length relative to a value that corresponds to a shorter DRX cycle length if this is more appropriate and optimal for the terminal's mobility state.

Figure 2:
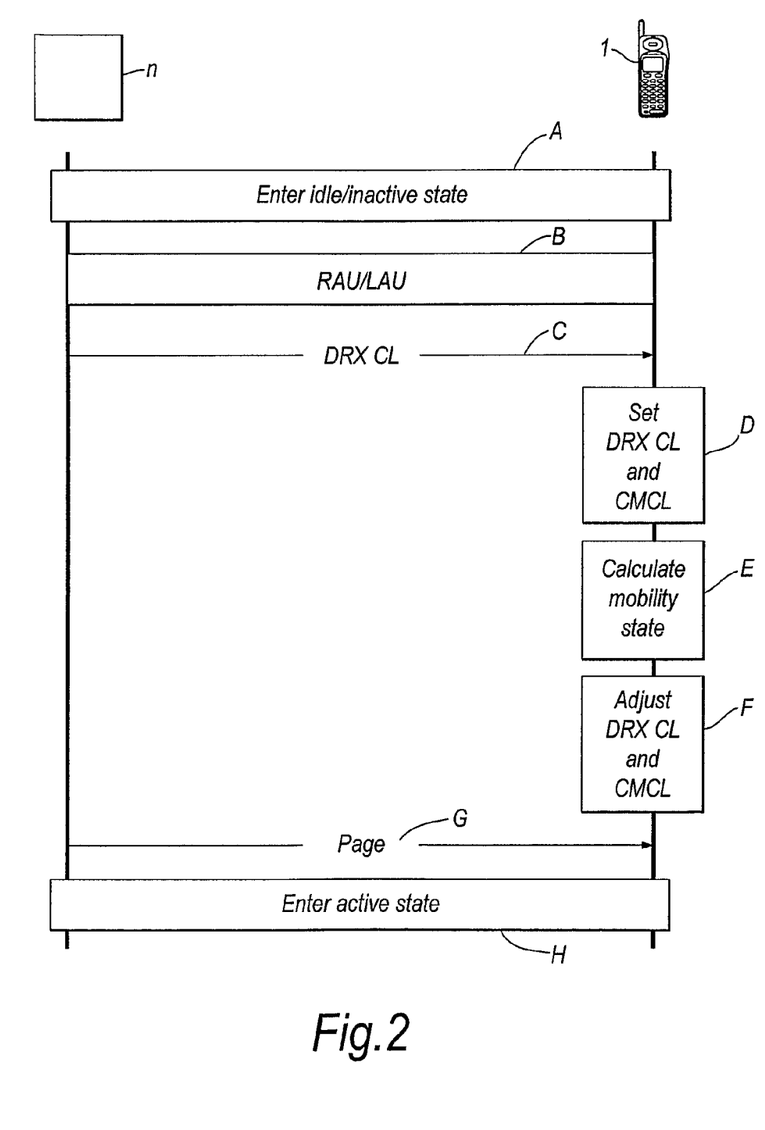
FIG. 2 shows the steps performed according to a first embodiment of the system described herein where the DRX cycle length is adjusted by the mobile terminal.

FIG. 2 shows the steps performed by the network n and the mobile terminal 1 in the first embodiment of the system described herein. At step A the mobile terminal enters the idle/inactive state. At step B a routeing area update (RAU) or location area update (LAU) is performed in the conventional manner described above. As part of the routeing area update procedure a DRX cycle length ("DRX CL") value determined by the network n is transmitted to the mobile terminal 1 in step C. Mobile terminal 1 includes means for performing step D, where the mobile terminal sets the DRX cycle length according to the data received in step C or by reading the BCH. Because the cell measurement cycle length ("CMCL") is defined relative to the DRX cycle length, the cell measurement cycle length is also set in step D.

The mobile terminal 1 includes means for performing at step E a calculation of the mobility state of the mobile terminal 1. The mobility state may be determined to be "high mobility" or "low mobility". The determination of the mobility state may be in accordance with the methods described above.

The mobile terminal 1 further includes means for performing step F, to adjust the DRX cycle length and the cell measurement cycle length in dependence upon the calculated mobility state from step E. For example, if the DRX cycle length transmitted from the network n at step C and set at step D causes the mobile terminal 1 to listen for pages only at large time intervals, and to perform mobility state calculations at consequently large time intervals set by the cell management cycle length, whilst the calculated mobility state (determined at step E) indicates that the mobile terminal 1 is in a "high mobility" state, then (at step F) the mobile terminal 1 can adjust the DRX cycle length and consequently the cell measurement cycle length to be performed at a relatively short time interval that is more appropriate to the mobility state of the mobile terminal 1.

In the idle/inactive state the mobile terminal 1 may receive a page at step G at the time intervals determined by the DRX cycle length. Subsequently, the mobile terminal 1 may enter the active state at step H in order to establish a communication session with the network n to receive mobile terminating data indicated by the page at step G.

For the DRX relating to paging from the MSC in a Location Area, the network n (rather than the mobile terminal 1) may control this functionality by broadcasting indications of the DRX Cycle Length within the system information or on some other channel. It is then possible for the network to tune the Cell Measurement Cycle Length settings explicitly (i.e. setting values for the required cell measurement period).

Figure 3:
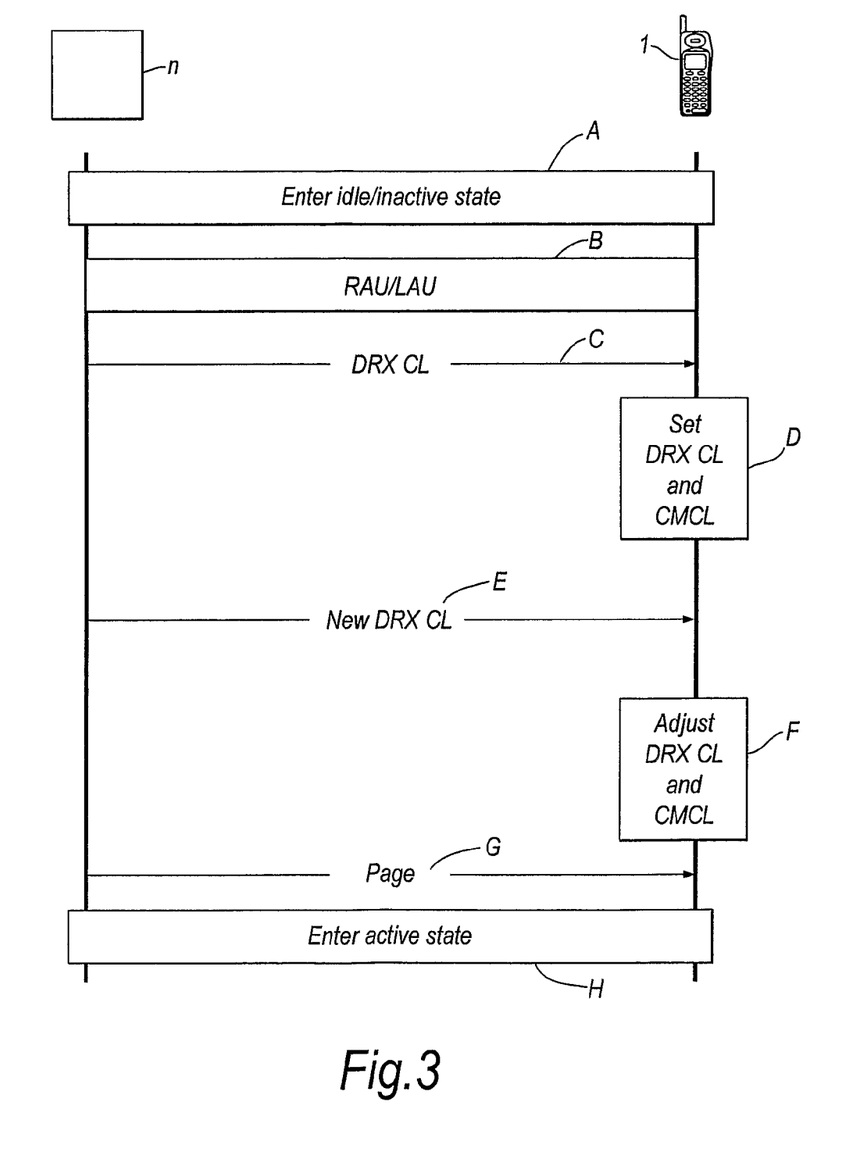
FIG. 3 shows the steps performed in a modification of the first embodiment, where the DRX cycle length is adjusted by the network.

FIG. 3 shows this optional arrangement, where the network may vary the DRX Cycle Length. Steps A,B,C and D are performed as in FIG. 2. However, in FIG. 3, at step E a second DRX Cycle Length is transmitted within the system information or some other channel from the network end to be used in case that the mobile terminal detects that it is fast moving, and in this case "second" DRX cycle length is aligned with CMCL. Mobile terminal 1 receives the new DRX Cycle Length value at step E and then, at step F, adjusts the DRX Cycle Length in accordance with the value received at step E. The cell measurement cycle length value is consequently also adjusted at step F. The mobile terminal 1 may subsequently receive a page from the network n at step G, and enter the active state at step H, in a similar manner to that described in relation to FIG. 2.

This embodiment optimises cell re-selection performance and reduces the probability of the mobile terminal 1 being on a cell which is not the best cell, or not camping on a cell which is the best cell because of measurement limitations. This will thus reduce the probability of network or access attempts failing, and the mobile terminal 1 causing unnecessary interference to other cells on the same RF carrier or different RF carriers. Further, it enables networks to initially set paging cycle lengths in a manner which would optimise battery consumption and paging load, with the knowledge that the cell measurement performance would be sufficient when the mobile terminal is moving fast because the initial DRX Cycle Length set by the network can be overridden. Furthermore, operators do not have to set short DRX cycle lengths within location/routeing areas where they suspect there may be fast moving mobiles, and thus additional battery consumption in these areas for mobiles that do not need more reactive measurement performance will be minimised.

The first embodiment is not only relevant for UMTS. It is relevant to any other cellular mobile system where there is a need for the mobile to maintain its coverage of the network, whilst there being a need for the mobile to minimise its power consumption.

A second embodiment of the system described herein will now be described.

In the active state, there are implementation-specific methods for the network to determine whether the mobile terminal is fast-moving or not. This can enable the network to set the handover settings appropriately when the mobile terminal is in an active state, to allow good handover performance, and also it can help the network set network settings accordingly, for example the channel quality reporting frequency for HSDPA.

Good handover performance means that, when it is moving fast, the mobile terminal does not drop the call due to measurement reporting in the mobile terminal being delayed. When the mobile terminal is moving slowly, it means that the measurement reporting in the mobile terminal is delayed sufficiently to allow the mobile terminal to take enough measurements to average out slow fading of the radio channel.

From the preceding discussions, it should be clear that mobility is controlled differently in the active and inactive states. In the active state handover between cells is (primarily) controlled by the network. In the inactive/idle state cell reselection is (primarily) controlled by the mobile terminal. However, in both states a determination of the mobility state may be made, e.g. whether the mobile terminal is "fast moving" or "slow moving".

When a mobile terminal has a packet switched connection, then it is quite likely that this mobile terminal will only send/receive bursts of data (e.g. for web browsing). Therefore, normally the network will only provide the mobile terminal with a dedicated resource when the mobile terminal wishes to perform data transfer.

Considering the above points, then it can be quite likely for the mobile terminal to be frequently moving between active and inactive RRC states (i.e. idle mode or URA_PCH state, CELL_FACH and CELL_PCH. In this case it could be difficult for the network to gain historical information regarding the mobile terminal's mobility immediately when the mobile terminal switches to active state (e.g. number of cell changes within a given time interval), in order to deduce that it is moving quickly or slowly. This is a problem with prior art mobility management arrangements which all rely on historical information to be available within the RNC 13. This means that it takes some time for the network n to be able to be confident in providing optimal handover settings to the mobile terminal 1 in the active state.

Therefore, in the prior art, for all handover types (intra frequency, inter-frequency, and inter-RAT), the handover parameter settings provided by the network n to the mobile terminal 1 may not be optimal, and it could be possible for there to be an increase in dropped calls for the fast moving mobile terminal, or an increase in unnecessary handovers (e.g. to another frequency) for the slow moving mobile terminal. If a PS call is dropped, this may mean that TCP restarts, and throughput is heavily reduced (and there is a delay in re-starting data transfer. This can be a cyclic problem if the mobile terminal is continuously moving quickly.

In the second embodiment of the system described herein it is proposed that when the mobile terminal enters an active data transfer state (i.e. CELL_DCH in UTRAN), then it provides information to the network to indicate explicitly whether it considers itself to be "fast moving" or "slow moving". This information is that obtained during the preceding inactive state, and is based on the mobile terminal entering "high mobility state" or "low mobility rate" where Hierarchical Cell Structures (HCS) are used, or by deducing that it is moving quickly based on the non-HCS methods described in 3GPP specifications. This allows the network to set optimal handover settings in the mobile terminal as soon as it enters the active CELL_DCH state based on information gathered during the preceding inactive state and reduces the risk of the connection being dropped.

Figure 4:
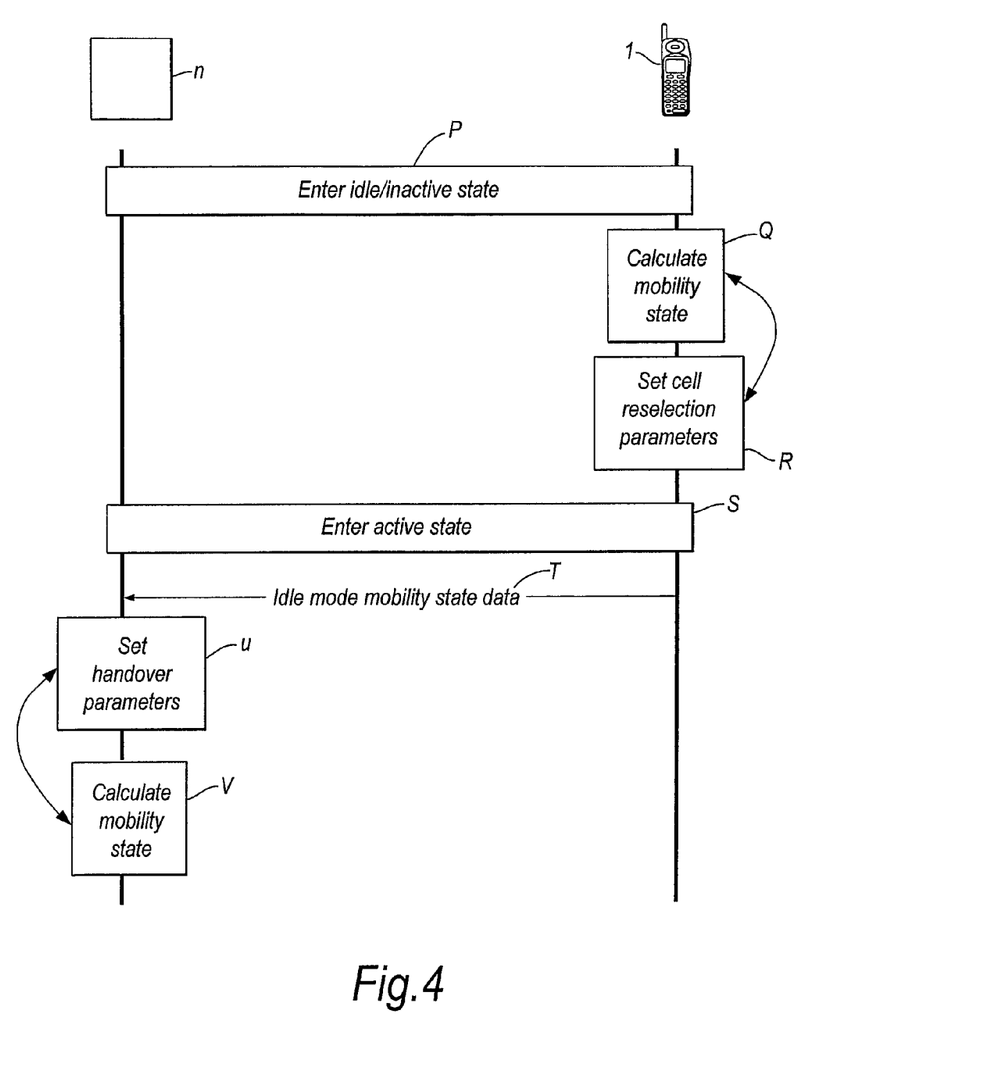
FIG. 4 shows the steps performed according to a second embodiment of the system described herein when a mobile terminal moves from the inactive state to the active state, in order to improve the accuracy of the handover parameters in the active state.

FIG. 4 shows the steps taken by the network n and the mobile terminal 1 according to the second embodiment of the system described herein. At step P the mobile terminal 1 enters the idle/inactive state. For example, this may occur after a predetermined period of inactivity. In the inactive state the mobile terminal 1 calculates at step Q its mobility state in the manner described above. The mobile terminal then sets the cell reselection parameters at step R in accordance with the mobility state calculated at step Q. Steps Q and R are periodically repeated in a loop so that the cell reselection parameters are frequently adjusted in accordance with the periodically calculated mobility state, in the manner described above.

At step S the mobile terminal 1 enters the active state. In accordance with the second embodiment, the idle/inactive mode mobility state data determines at step Q is transmitted from the mobile terminal 1 to the network n at step T. The network n includes means to receive and process the idle/inactive mode mobility state data and to use this to set appropriate handover parameters at step U. The network n then calculates the mobility state at step V in the manner described above. The calculations made at step V are used to adjust the handover parameters at step U. Steps U and V are repeated in a loop periodically so that the handover parameters are adjusted in accordance with the prevailing mobility state in the active state.

When the active state is initially entered, the historical mobility state data from the idle state transmitted in step T can be used to set appropriate handover parameters from the beginning of the active state, when sufficient historical mobility state data has not yet been calculated in the active state.

The mobile terminal may also send information to the network indicating how long it has been since the last cell change. This may help the network to understand how long the mobile terminal has to make the next cell change before the network can consider the mobile terminal to change between "fast moving" and "slow moving". For example if the mobile terminal indicates that it last changed cell 6 seconds ago, and the network believes that to keep the mobile terminal in "high mobility" state there should be a 10 s gap between cell changes, then it would be possible for the network to start its timer from 6 s and count a further 4 s before deciding whether the mobile terminal (in active state) should remain in "high mobility" state.

This embodiment is particularly advantageous when the mobile terminal is in the URA_PCH state. When the mobile terminal is in the CELL PCH or CELL FACH state the mobile terminal indicates to the network every time it changes cell so in theory the network could maintain a history of the mobile terminal mobility state.

A third embodiment of the system described herein will now be explained. In the prior art, when a mobile terminal leaves an "active" RRC state (CELL_DCH in UMTS) it always considers itself as being in "low mobility state" for the selection of the cell reselection parameter to be used. This decision has been taken in the prior art in order to "simplify" the mobile terminal behaviour.

According to the third embodiment, the mobile terminal initially maintains in the inactive RRC state the "mobility state" that it had when it was in the preceding active CELL_DCH state (e.g. "fast moving" or "slow moving"). In this way the mobile terminal does not have to re-start its "mobility" context when it enters idle state. The "mobility state" from the active state is initially used in the inactive state but can be subsequently changed in accordance with mobility calculations made while the mobile terminal is in the inactive state.

Figure 5:
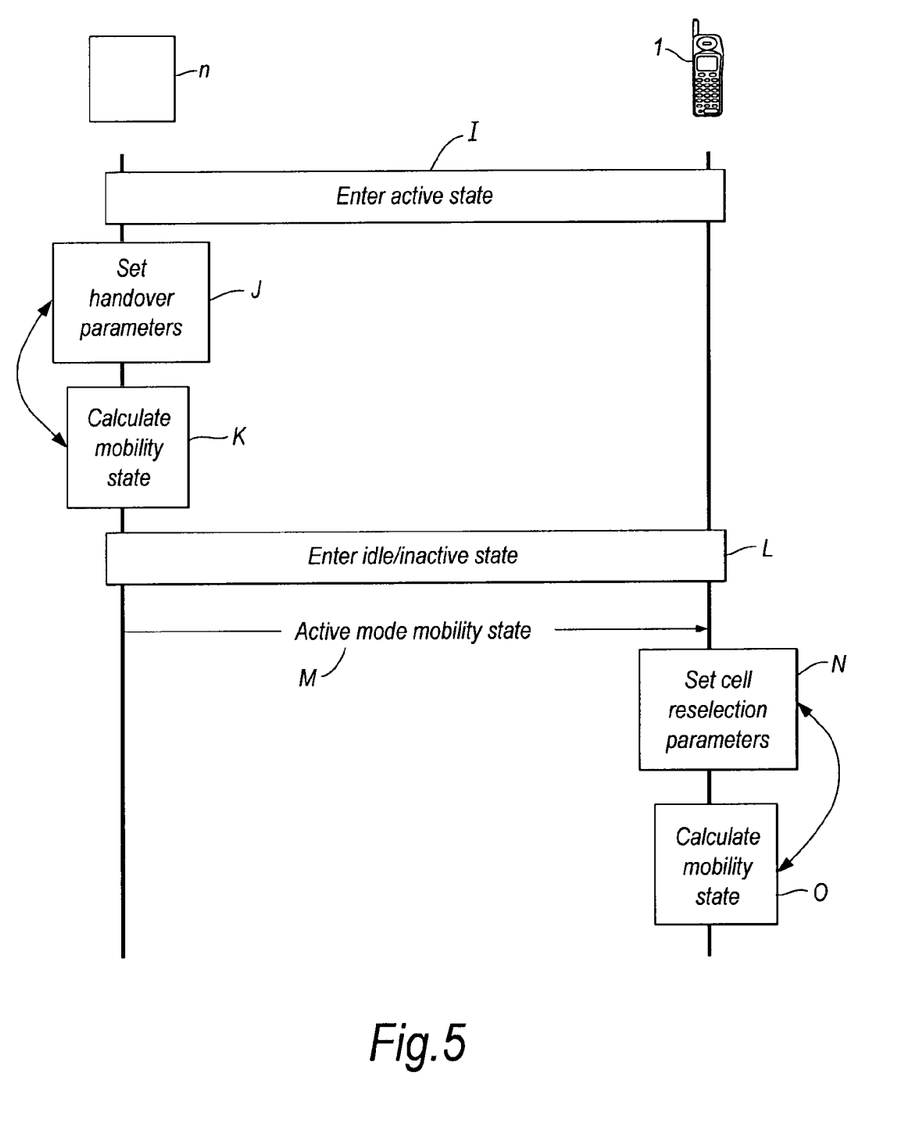
FIG. 5 shows the steps performed according to a third embodiment of the system described herein when a mobile terminal moves from the active state to an inactive state, which allow the cell reselection parameters to be optimised in the inactive state.

The third embodiment will now be described in relation to FIG. 5. At step I the active state is entered. At step J the handover parameters are set, and at step K the mobility state is calculated, in the manner described above. Steps J and K are performed repeatedly in a loop in order that the handover parameters are optimised as the mobility state of the mobile terminal 1 varies.

At step L the idle/inactive state is entered. In accordance with the third embodiment of the invention system described herein at step M active mode mobility state data is transmitted from the network N to the mobile terminal 1.

At step N the mobile terminal 1 sets cell reselection parameters. In accordance with a third embodiment the cell reselection parameters use the active mode mobility state data provided at step M when the mobile terminal 1 initially enters the inactive state. This allows the cell reselection parameters to be optimised at this initial stage of the inactive state before sufficient mobility state calculations have been performed at step O. Steps N and O are performed in a loop repeatedly in order that the cell reselection parameters can be optimised as the mobility state changes in the inactive state.

Abnormal transitions to inactive/Idle could be handled as an exception (e.g. mobile terminal could assume "low mobility"). This mechanism has the advantage to be simple and not to require significant extra complexity in the mobile terminal.

The second and third embodiments are not only relevant for UMTS. It is relevant to any other cellular or mobile system where there is a need for the handover parameters, re-selection parameters or other parameters which may be affected by the speed of the mobile terminal, to be modified accordingly.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A mobile telecommunications network, comprising:
at least one mobile terminal registered therewith;
a calculation device that calculates periodically at a minimum frequency an indication of the movement of the mobile terminal within the network, wherein the indication of the movement of the mobile terminal corresponds to a velocity of the mobile terminal, and wherein a value on which said minimum frequency is dependent is transmitted to the mobile terminal by the network, wherein said calculation device internally modifies one of: the value and the minimum frequency to be relative to a shorter value when the mobile terminal is detected as fast moving; and
an adjustment device that varies at least one of: said minimum frequency and said value in dependence upon said movement indication, wherein the mobile terminal has an active communication state with the network and an inactive communication state with the network, and wherein the calculation device calculates the movement indication differently depending on whether the mobile terminal is in the active communication state or the inactive communication state, the calculating device including a first processor comprised in the mobile terminal for calculating the movement indication of the mobile terminal in the inactive communication state and a second processor comprised in the network and external to the mobile terminal for calculating the movement indication of the mobile terminal in the active communication state.

2. The network of claim 1, wherein the adjustment device varies the minimum frequency in said inactive communication state.

3. The network of claim 1, wherein said value transmitted by the network is a DRX cycle length.

4. The network of claim 1, wherein said value transmitted by the network is transmitted in response to a routeing area update performed by the mobile terminal.

5. The network of claim 1, wherein said value transmitted by the network is transmitted in the broadcast channel as part of system information sent to the mobile terminal.

6. The network of claim 1, wherein the calculation device determines whether the mobile terminal is in a high mobility state or a low mobility state.

7. The network of claim 1, wherein the calculation device transmits a message to the mobile terminal.

8. The network of claim 7, wherein the message provides the value that the minimum frequency should be set relative to in case that the terminal is detected as fast moving.

9. The network of claim 7, wherein said message is transmitted as system information.

10. A mobile telecommunications network, comprising:
at least one mobile terminal registered with the network, wherein the mobile terminal has an active communication state with the network and an inactive communication state with the network;
a calculation device that calculates an indication of the movement of the mobile terminal within the network in each of said states, wherein the indication of the movement of the mobile terminal corresponds to a velocity of the mobile terminal, wherein, when communication changes from a first of said states to a second of said states, the movement indication calculated in the first of said states is used in the second of said states, and wherein the calculation device calculates the movement indication of the mobile terminal differently depending on whether the mobile terminal is in the active communication state or the inactive communication state, the calculating device including a first processor comprised in the mobile terminal for calculating the movement indication of the mobile terminal in the inactive communication state and a second processor comprised in the network and external to the mobile terminal for calculating the movement indication of the mobile terminal in the active communication state, wherein said first processor is operable to adjust cell reselection parameters in accordance with a plurality of said movement indications.

11. The telecommunications network of claim 10, wherein the calculation device determines whether the mobile terminal is in a high mobility state or a low mobility state.

12. The network of claim 10, wherein said first of said states is the active communication state and said second of said states is the inactive communication state, and wherein the movement indication calculated in the active communication state is transmitted by the network to the mobile terminal, when the inactive communication state is entered, for use by the first processor.

13. The network of claim 10, wherein said first of said states is the inactive communication state and said second of said states is the active communication state, and wherein the movement indication calculated in the inactive communication state is transmitted by the mobile terminal to the network when the active communication state is entered, for use by said second processor.

14. The network of claim 10, wherein said second processor is operable to adjust the handover parameters in accordance with a plurality of said movement indications.

15. A method of operating mobile telecommunications network including at least one mobile terminal registered therewith, the method comprising:
calculating periodically at minimum frequency an indication of the movement of the mobile terminal within the network, wherein the indication of the movement of the mobile terminal corresponds to a velocity of the mobile terminal, and wherein a value on which said minimum frequency is dependent is transmitted to the mobile terminal by the network, wherein said calculating step internally modifies one of: the value and the minimum frequency to be relative to a shorter value when the mobile terminal is detected as fast moving; and
varying at least one of: said minimum frequency and said value in dependence upon said movement indication, wherein the mobile terminal has an active communication state with the network and an inactive communication state with the network, and wherein the calculating includes calculating the movement indication of the mobile terminal differently depending on whether the mobile terminal is the active communication state or the inactive communication state, the calculating of the movement indication being performed by the mobile terminal in the inactive communication state and being performed by the network, external to the mobile terminal, in the active communication state.

16. The method of claim 15, wherein the varying step varies the minimum frequency in said inactive communication state.

17. The method of claim 15, wherein said value transmitted by the network is a DRX cycle length.

18. The method of claim 15, wherein said value transmitted by the network is transmitted in response to a routeing area update performed by the mobile terminal.

19. The method of claim 15, wherein said value transmitted by the network is transmitted in the broadcast channel as part of system information sent to the mobile terminal.

20. The method of claim 15, wherein the calculating step determines whether the mobile terminal is in a high mobility state or a low mobility state.

21. The method according to claim 15, wherein the calculating step is performed by said mobile terminal.

22. The method of claim 15, wherein the calculating step is performed by the network and which transmits a message to the mobile terminal.

23. The method of claim 22, wherein the message provides the value that the minimum frequency should be set relative to in case that the terminal is detected as fast moving.

24. The method of claim 22, wherein said message is transmitted as system information.

25. A method of operating a mobile telecommunications network with which at least one mobile terminal is registered, wherein the mobile terminal has an active communication state with the network and an inactive communication state with the network, the method comprising:
calculating an indication of the movement of the mobile terminal within the network in each of said states, wherein the indication of the movement of the mobile terminal corresponds to a velocity of the mobile terminal, wherein the calculating includes calculating the movement indication of the mobile terminal differently depending on whether the mobile terminal is the active communication state or the inactive communication state, and wherein, when communication changes from a first of said states to a second of said states, the movement indication calculated in the first of said states is used in the second of said states, wherein said calculating step is performed by a first processor comprised in the mobile terminal for calculating the movement indication of the mobile terminal in the inactive communication state, and wherein said calculating step is performed by a second processor comprised in the network and external to the mobile terminal for calculating the movement indication of the mobile terminal in the active communication state, wherein said first processor is operable to adjust cell reselection parameters in accordance with a plurality of said movement indications.

26. The method network of claim 25, wherein the calculating step determines whether the mobile terminal is in a high mobility state or a low mobility state.

27. The method of claim 25, wherein said first of said states is the active communication state and said second of said states is the inactive communication state, and wherein the movement indication calculated in the active communication state is transmitted by the network to the mobile terminal, when the inactive communication state is entered, for use by the first processor.

28. The method of claim 25, wherein said first of said states is the inactive communication state and said second of said states is the active communication state, and wherein the movement indication calculated in the inactive communication state is transmitted by the mobile terminal to the network when the active communication state is entered, for use by said second processor.

29. The method of claim 25, wherein said second processor is operable to adjust the handover parameters in accordance with a plurality of said movement indications.

* * * * *